United States Patent [19]

Burgiss, Sr.

[11] 4,443,866
[45] Apr. 17, 1984

[54] AUTOMATIC DEVICE SELECTION CIRCUIT

[75] Inventor: Samuel G. Burgiss, Sr., Raleigh, N.C.

[73] Assignee: Corning Glass Works, Corning, N.Y.

[21] Appl. No.: 608,149

[22] Filed: Aug. 27, 1975

[51] Int. Cl.³ .......................... G06F 3/00; G06F 7/00
[52] U.S. Cl. .................................................. 364/900
[58] Field of Search ............................. 364/200, 900

[56] References Cited

U.S. PATENT DOCUMENTS

| | | | |
|---|---|---|---|
| 401,067 | 4/1889 | Reilly | 179/98 |
| 3,226,688 | 12/1965 | Amdahl et al. | 340/172.5 |
| 3,363,234 | 1/1968 | Erickson et al. | 340/172.5 |
| 3,377,619 | 4/1968 | Marsh et al. | 340/172.5 |
| 3,566,004 | 2/1971 | Creedon | 179/98 X |
| 3,710,030 | 1/1973 | Dartois | 179/98 |
| 3,796,848 | 3/1974 | Southworth | 179/98 |
| 3,810,105 | 5/1974 | England | 364/200 |
| 3,813,651 | 5/1974 | Yamada | 340/172.5 |
| 3,815,099 | 6/1974 | Cohen et al. | 340/172.5 |
| 3,881,174 | 4/1975 | Barnich | 340/172.5 |
| 3,889,236 | 6/1975 | Herger et al. | 364/200 |
| 4,050,098 | 9/1977 | Seipp | 364/900 |

FOREIGN PATENT DOCUMENTS 396043 11/1921 Fed. Rep. of Germany ........ 179/18

*Primary Examiner*—Felix D. Gruber
*Assistant Examiner*—John G. Mills
*Attorney, Agent, or Firm*—W. J. Simmons, Jr.

[57] ABSTRACT

A plurality of controlled devices are connected to a controller in such a manner that the first device is connected by a cable to the controller, the second device is connected by a cable to the first device and so on. Interconnection means at each controlled device, which connects the cable from the previous device to the cable connected to the next device, automatically assigns a unit address to each device depending upon the position of that device in the chain of devices. Thus, if four devices are connected in a chain to the controller, their addresses are 1, 2, 3 and 4, beginning with the first unit connected to the controller and ending with the last unit in the chain of devices.

4 Claims, 4 Drawing Figures

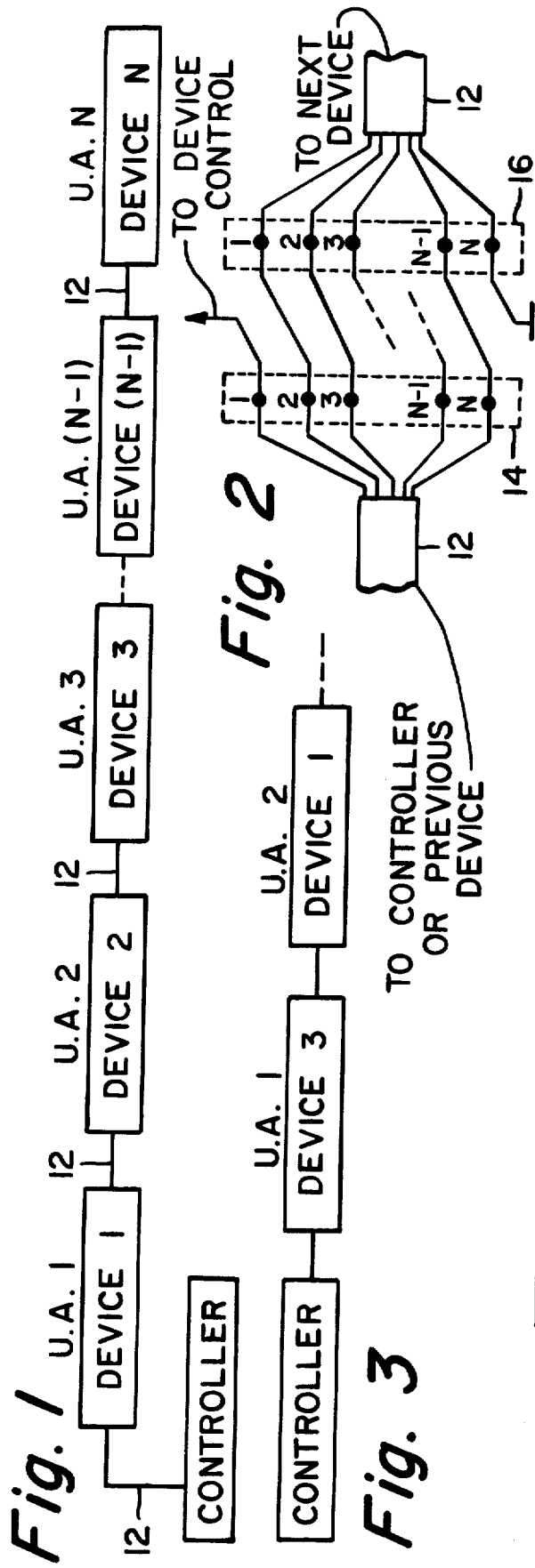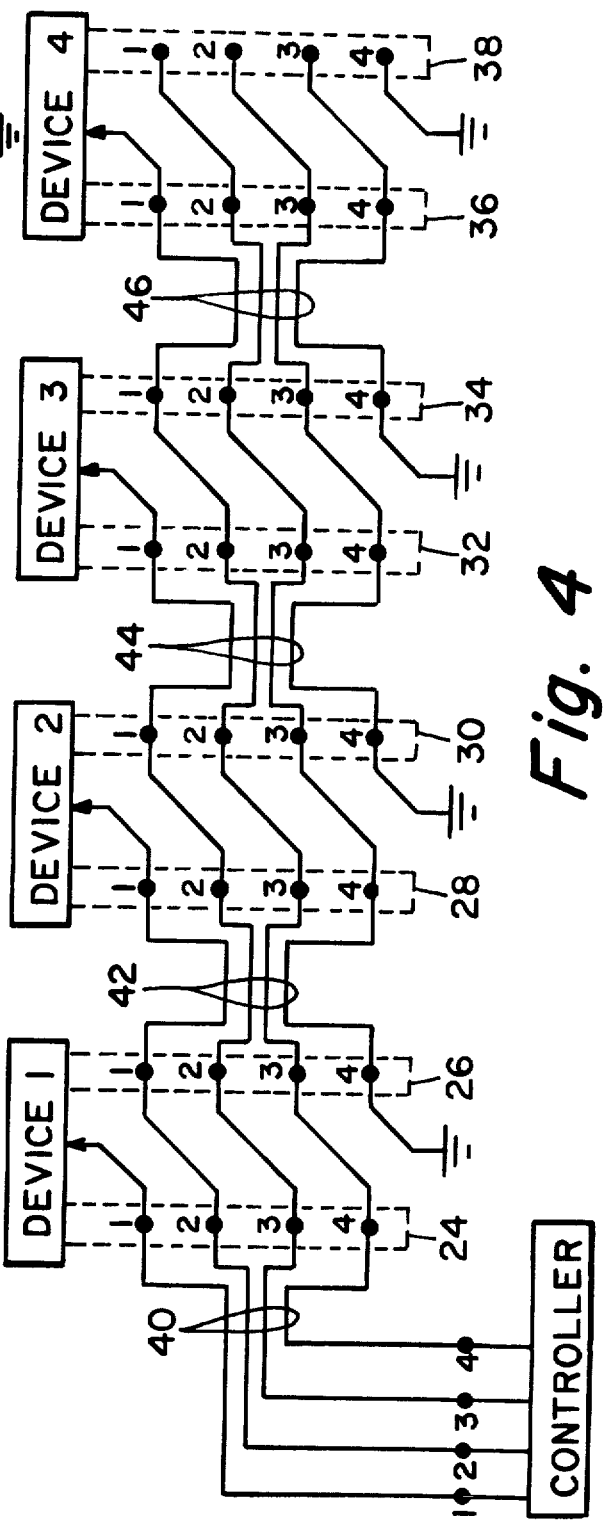

AUTOMATIC DEVICE SELECTION CIRCUIT

BACKGROUND OF THE INVENTION

The present invention relates to a system for interconnecting a plurality of controlled devices in such a manner that the controller can address any one of the controlled devices. More particularly, this invention relates to a device connection system wherein a unit address depends only upon the position in which that unit is located in a chain of devices which are connected to a controller.

In a bus tap type of device interconnection system, a plurality of controlled devices are often connected to a signal bus that is controlled by a single set of control electronics. For example, several cassette drives may be connected to a computer via a single bus and controller. In such systems each unit is assigned an address. When the controller transmits an address, the proper unit responds. The unit address to be assigned to a particular controlled device is usually selected by a thumbwheel switch on the unit. This method is expensive and is subject to human error. For example, the thumbwheel can be erroneously set to the wrong number, or a correctly set thumbwheel switch can be bumped, thereby resulting in an incorrect setting.

In a master-slave type interconnection system, the master controlled device is connected to the controller, and, like the previously described bus tap system, only a single interface board is required at the controller. The remainder of the controlled devices, the slave devices, are connected to the master controlled device. Device code selection and control is performed in the master controlled device. This system is disadvantageous in that the master device is different from the slave devices, and the cost and complexity of the system is therefore increased.

In a multi interface device connection system each device is separately connected by an electronic card to the signal bus of the controller. This system is disadvantageous in that each device requires an electronic board connected to the signal bus, and device codes must be manually selected on those boards.

SUMMARY OF THE INVENTION

Briefly, the present invention relates to an automatic device addressing system which comprises N controlled devices and a controller having at least N terminals that are adapted to be respectively connected to the devices. Each device is provided with a first set of terminals and a second set of terminals, each of the sets of terminals having at least N terminals. The first terminal of the input set is connected to the device with which that set of terminals is associated. Each of the remaining of the input set of terminals of each device is connected to the next lower numbered terminal of the output set of terminals associated with that device. Means are provided for connecting the controller to the first set of terminals of the first device and for connecting the second set of terminals of each of the devices to the first set of terminals of the next adjacent device. The devices are connected in the order in which they are to be addressed by the controller. The interconnection between the first and second sets of terminals in each device is such that the first device which is connected to the controller is connected to the first controller terminal, the Nth device is connected to the Nth controller terminal, and each device therebetween is connected to its respective controller terminal.

BRIEF DESCRIPTION OF THE DRAWINGS

FIG. 1 is a schematic diagram in block diagram form illustrating the manner in which a plurality of controlled devices are connected to a controller in accordance with the present invention.

FIG. 2 illustrates a terminal interconnection arrangement employed at each of the controlled devices.

FIG. 3 is a schematic illustration in block diagram form which illustrates the automatic unit address assignment feature of the present invention.

FIG. 4 is a schematic diagram of a specific embodiment of the present invention.

DETAILED DESCRIPTION

As illustrated in FIG. 1, any number of controlled devices can be connected in a "daisy chain" fashion to a controller. As is well known in the art, the controller may comprise a computer and its interface, a calculator or any other type of electronic control system. The controlled devices may be tape drives, printers or the like. The interconnection scheme of the present invention automatically selects the unit address for each of the devices. Thus, in FIG. 1, device 1 automatically assumes unit address 1 since it is the first device connected to the controller. Device 2 has unit address 2 since it is connected to device 1. Each of the devices are in turn provided with unit addresses in accordance with their position in the chain so that device N, the last device in the chain has unit address N.

In accordance with the present invention, each of the cables 12 contains at least N active leads and each of the controlled devices is provided with first and second sets 14 and 16 of terminals which are interconnected as illustrated in FIG. 2. Each set of terminals consists of at least N terminals wherein N devices are to be connected to the controller. Each of the cables 12 comprises at least N active leads, and each cable is provided with polarized terminations which ensure that the first lead is connected to the first terminal position, the second lead is connected to the second terminal position, and so on. The first terminal in se′ 14 is connected to the device control. Each of the remaining terminals of terminal set 14 is connected to the next lower numbered terminal of terminal set 16. Thus, the second terminal from set 14 is connected to the first terminal of set 16 and so on until the Nth terminal of set 14 is connected to the (N−1)th terminal of set 16. The Nth terminal of set 16 may remain unconnected or it may be connected to a common terminal as illustrated.

Since each controlled device is provided with two sets of terminals of the type illustrated in FIG. 2, the devices will automatically be assigned a unit address which depends only upon the position of the device in the chain of devices. Thus, if the controlled devices illustrated in FIG. 1 were interchanged as illustrated in FIG. 3 so that, for example, device 3 is connected to the controller and device 1 is connected to device 3, device 3 will automatically be assigned unit address 1, and device 1 will automatically be assigned unit address 2, and so on. This automatic method of unit address selection is advantageous in that it eliminates operator errors. Every device which is connected in the chain has a different unit address, and each unit address is automatically assigned in accordance with device position.

The schematic diagram of FIG. 4 illustrates the manner in which four controlled devices are interconnected with a controller in accordance with the present invention. Device 1 is provided with terminal sets 24 and 26, device 2 is provided with terminal sets 28 and 30, device 3 is provided with terminal sets 32 and 34, and device 4 is provided with terminal sets 36 and 38. Each pair of terminal sets that is associated with one of the devices is interconnected in the manner described in conjunction with FIG. 2. Cable 40 is connected between the controller and device 1, and cables 42, 44 and 46 interconnect devices 1, 2, 3 and 4. Since four devices are to be interconnected, each cable must contain at least four active leads. Furthermore, the cable terminations are polarized so that leads 1, 2, 3 and 4 of each cable are connected to terminals 1, 2, 3 and 4 of each terminal set. The termination on the remaining end of cable 40 is such that the appropriate leads are connected to terminals 1, 2, 3 and 4 on the controller.

To activate or energize device 1, controller terminal 1 is energized. Cable 40 connects controller terminal 1 to terminal 1 of set 24, which is connected to device 1.

Because of the manner in which terminal sets 24 and 26 are interconnected, device 2 can be energized by energizing controller terminal 2. Cable 40 connects controller terminal 2 to terminal 2 of set 24. Terminal 1 of set 26 is connected to terminal 2 of set 24. Cable 42 connects terminal 1 of set 26 to terminal 1 of set 28. Since terminal 1 of each of the input terminal sets 24, 28, 32 and 36 is connected to the associated device, device 2 is energized when controller terminal 2 is energized.

In a similar manner devices 3 and 4 are energized by energizing controller terminals 3 and 4, respectively. Since the terminal sets associated with devices 1, 2, 3 and 4 are identical, these devices can be connected in any desired sequence, and the unit address of each device is automatically determined in accordance with the position of that device in the chain. The device interconnection scheme of the present invention permits a specific device to be connected in any position in the chain or to be connected alone to the controller without address selection switches or internal electronic modification. With this capability, a system of units may be composed of any available devices which have previously been used in single-unit systems or multiple-unit systems.

I claim:

1. A device interconnecting system for automatically assigning a unit address to each device depending upon the position of the device in a chain of devices, said system comprising control means having N terminals, said control means being capable of energizing any one or more of said N terminals, N controlled devices, each having first and second sets of terminals, each of said sets of terminals having N terminals, each terminal in said first and second sets being designated by a different one of the numerals 1 through N, respectively, the first terminal of said first set of terminals being connected to the device with which said set is associated, each of the remaining of said first set of terminals of each device being connected to the next lower numbered terminal of the second set of terminals that is associated with the device, N cables, each having N conductive leads therein, one of said cables being connected between said N controller terminals and a first one of said N controlled devices, and each of the remaining (N−1) of said cables being connected between the second set of terminals of a respective one of said N devices and the first set of terminals of the next adjacent one of said N devices, each of said cables having polarized terminations whereby a first lead in each cable is connected between the first terminal of the two sets of terminals to which that cable is connected, the Nth lead in each cable is connected between the Nth terminal of the two sets of terminals to which that cable is connected, and each of the remaining leads in each cable is connected between corresponding terminals of the two sets of terminals to which that cable is connected, whereby the first terminal of said control means becomes connected to the first controlled device in the chain of devices extending from said control means, and each of the second through the Nth terminals of said control means becomes connected to the respective one of the second through the Nth controlled devices in the chain of devices extending from said control means so that the unit address of each device is automatically determined in accordance with the position of that device in the chain of devices extending from said control means.

2. The system of claim 1 wherein the terminals of each of said sets of terminals are arranged in a linear array wherein terminals 1 through N are arranged in numerical order.

3. In a module for a programmable controller, said module including enabling means for enabling said module upon receipt of a module enabling signal, and conductor means on said module for conducting said module enabling signal to said enabling means, the improvement comprising: a set of input terminals arranged on said module in a preselected pattern having a successive numerical order of 1, 2, 3 . . . n; a set of output terminals arranged on said module in said preselected pattern; means on said module for connecting said input terminal in said number one position to said conductor means; means on said module for connecting each of the remaining input terminals to output terminals in the corresponding next lower numerical positions of said preselected pattern of output terminals.

4. The improvement as defined in claim 6 wherein said input terminals are located at a first preselected position on said module and said output terminals are located at a second preselected position on said module, with said first and second preselected positions being mutually aligned.

* * * * *